Figure 1:
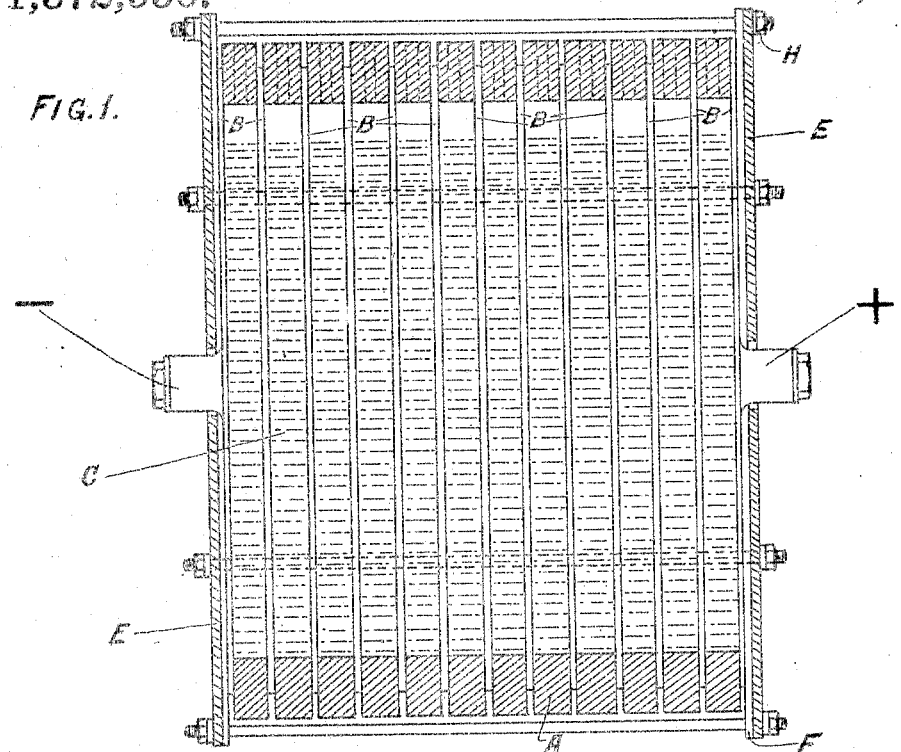

R. C. HOUSTON.
BATTERY.
APPLICATION FILED OCT. 23, 1919.

1,372,950. Patented Mar. 29, 1921.

Inventor
R. C. Houston
by his Atty

UNITED STATES PATENT OFFICE.

ROBERT CAMPBELL HOUSTON, OF GREENOCK, SCOTLAND.

BATTERY.

1,372,950.  Specification of Letters Patent.  Patented Mar. 29, 1921.

Application filed October 23, 1919. Serial No. 332,776.

*To all whom it may concern:*

Be it known that I, ROBERT CAMPBELL HOUSTON, a subject of the King of England, and residing at Greenock, in the county of Renfrew, Kingdom of Scotland, in the United Kingdom of Great Britain, have invented Batteries, of which the following is a specification.

This invention has reference to electric batteries or cells, namely, accumulator cells, storage and primary battery cells, electrolytic cells and the like, and it has for its object to generally improve such cells.

In the electric battery hereinafter described, the improvements under this invention are comprised.

In this battery the cells are connected one with the other by the plates being adapted to connect any two adjacent cells, so that the current passes in a straight line through all the plates from one terminal to the other, all other connections being rendered unnecessary; each plate at the same time forming one wall of the said two adjacent cells, so that one side of the plate being in one cell will be electrically positive, and at the same time the other side of the said plate on the adjacent cell will be electrically negative.

In making the cell, a vessel of suitable material is divided into the desired number of water-tight cells or compartments by the plates, all of the water-tight cells containing its own electrolyte.

A watertight or gas tight joint between the material of the vessel, and the material of the plates will be employed.

The series of cells may be assembled or made up in different ways; as for instance the vessel may be of any suitable material to withstand the chemical action of the electrolyte, and at the same time to electrically insulate one plate from the next; and it may be articulated, the top being pierced with the necessary vent holes; and the whole series of cells held together by bolts extending from one metal end plate of the battery in series to the other. Or any other convenient manner may be employed which provides a watertight joint between the material of the plates, and the material of the articulated vessel.

The plates are not necessarily made of metal, as this will depend on what type of cell they are to be used for. For instance, in the case of an electric accumulator or storage battery, the plates will be made of lead, and one of the terminals being connected to a metal plate at one end of the battery, and the other main terminal being connected to the metal plate at the other end. The electrolyte in this case will be dilute sulfuric acid.

In the case of the simplest form of primary battery, the plates may be composed of two thin sheets of zinc and copper, with their adjacent faces soldered or otherwise intimately connected adhesively. The zinc surface would be in one cell, and would be electrically negative, and the copper surface in the adjacent cell would be electrically positive. Thus two surfaces or sheets together form one plate.

The electrolyte may be either solid, liquid, or gas, or any mixture of these three.

The invention is illustrated in the accompanying drawings, which show a complete accumulator arranged and adapted to operate according to this invention.

Figure 2:
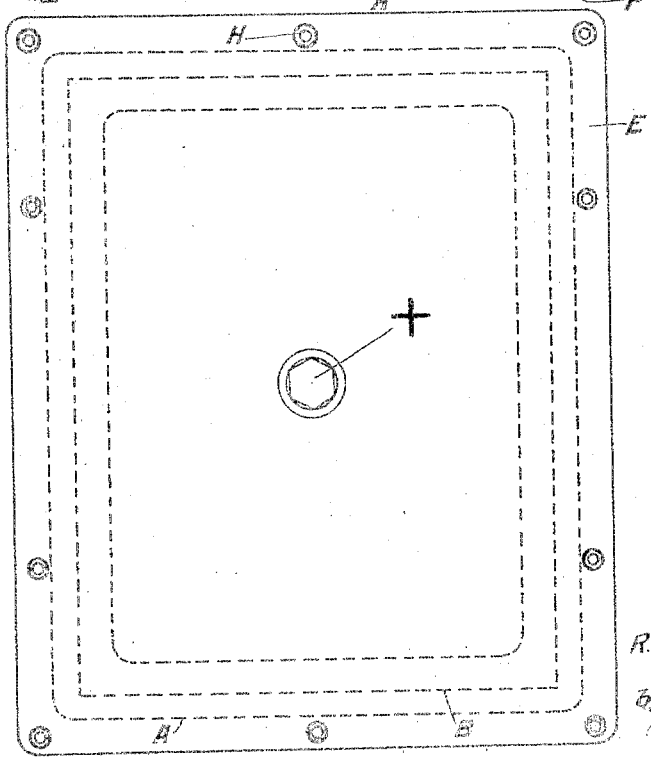

In these drawings, Figure 1 is a sectional elevation, and Fig. 2 an end view of a complete accumulator.

Referring to the drawings, the walls of the cells, that is the bottom, sides and top, are made of one piece of india-rubber or like insulation A, say by cutting them out of a solid sheet, holes being provided in the member of the wall which is to constitute the cover of the cells; and the plates B lie between each adjacent pair of the wall members A, and make liquid and gas tight joint with them all around. At each end there is a steel or other rigid metal plate E, and between these plates, and the electrode plates B, there is a lamina D of india-rubber or other insulation; and the whole of the parts are held and clamped together by means of bolts and nuts H passed through and extending from one plate E to the other, outside the frames and plates A, B.

The terminals are shown in the drawing on the two outside end plates B and may be soldered direct to these plates, or otherwise suitably secured to them.

The plates B in the battery shown may be assumed to be lead, and they can of course be stamped or embossed with any pattern, and may be pasted or not.

In the case of the invention being applied to an Edison type of battery, the electrode plates would not of course be made of lead.

The dotted lined parts C are the electrolyte, which in this case is dilute sulfuric acid; but according to the type of battery, to which the invention is applied, the electrolyte will be of a kind suitable to such a battery.

The invention as described in connection with the drawings, is applied to an accumulator, but in the case of primary batteries the plates may be made of two sheets of different suitable metals in the manner above described.

It will be seen that in this battery, the current passes in a straight line through all the plates from one main terminal to another.

By this, connections between the plates are rendered unnecessary, and the plates may be made much lighter in weight, the rate of charging and discharging will be increased, and the distribution of current over the surfaces of the plates rendered more uniform or perfect, while the battery will hold the charge for a longer time.

Furthermore, the space occupied by the battery will be less, and it will be relatively cheap to make and easier to repair; and generally the battery is rendered more efficient and reliable as a whole.

What is claimed is:—

A multiple cell battery, comprising a series of insulating wall members, with openings inwardly of the edge corresponding to the size of cell desired, battery plates arranged between said members and closing the openings thereof, the upper edge of each wall member being formed with a vent opening, side plates for the battery, and clamping means extending through said side plates and beyond the wall members.

In testimony whereof I have signed my name to this specification in the presence of two subscribing witnesses.

ROBERT CAMPBELL HOUSTON.

Witnesses:
HELEN GUNN,
MARION McGILLIVRAY.